(No Model.) 6 Sheets—Sheet 1.
H. CARMONT.
VEHICLE WHEEL.

No. 472,856. Patented Apr. 12, 1892.

Witnesses:—
J. A. Rutherford
Robert Everett

Inventor:
Hazelwood Carmont
By James L. Norris.
Attorney (No Model.) 6 Sheets—Sheet 2.

H. CARMONT.
VEHICLE WHEEL.

No. 472,856. Patented Apr. 12, 1892.

Witnesses:
J. A. Rutherford
Robert Everett

Inventor:
Hazelwood Carmont
By James L. Norris
Attorney (No Model.) 6 Sheets—Sheet 3.

H. CARMONT.
VEHICLE WHEEL.

No. 472,856. Patented Apr. 12, 1892.

(No Model.) 6 Sheets—Sheet 4.

H. CARMONT.
VEHICLE WHEEL.

No. 472,856. Patented Apr. 12, 1892.

(No Model.) 6 Sheets—Sheet 5.

H. CARMONT.
VEHICLE WHEEL.

No. 472,856. Patented Apr. 12, 1892.

(No Model.)  6 Sheets—Sheet 6.

H. CARMONT.
VEHICLE WHEEL.

No. 472,856.  Patented Apr. 12, 1892.

UNITED STATES PATENT OFFICE.

HAZELWOOD CARMONT, OF LONDON, ENGLAND.

VEHICLE-WHEEL.

SPECIFICATION forming part of Letters Patent No. 472,856, dated April 12, 1892.

Application filed December 26, 1891. Serial No. 416,184. (No model.) Patented in England April 30, 1891, No. 7,481; in France May 5, 1891, No. 213,263; in Belgium May 9, 1891, No. 94,846, and in Germany May 14, 1891, No. 59,768.

*To all whom it may concern:*

Be it known that I, HAZELWOOD CARMONT, a subject of the Queen of Great Britain, residing at Helmsdale, Ham, London, in the county of Surrey, England, have invented new and useful Improvements in and Relating to Wheels of Vehicles, (patented in Great Britain, No. 7,481, dated April 30, 1891; in France, No. 213,263, dated May 5, 1891; in Belgium, No. 94,846, dated May 9, 1891, and in Germany, No. 59,768, dated May 14, 1891,) of which the following is a specification.

My invention relates to certain improvements in and relating to wheels of vehicles, the object being to support the load on india-rubber cushions fitted partly in recesses between the hub and axle-box, or between hub and rim, or between felly and tire, which cushions are not wholly incased for compression, as is usually done, but have a portion both internally and externally exposed for free movement between the two incased parts and in such a manner that one half becomes eccentric to the other half by the weight of the body and of the load in a vehicle, the eccentricity of the two portions of each cushion being maintained during the rotation of the wheel without the axis of the cushions shifting from beneath the fixed axis round which the wheel rotates or by which the load is borne. The two sets of india-rubber cushions act as a resilient material and become altered in their contour, but retain the ring shape in or among themselves, the load being, so to speak, supported on two cushions of a resilient material in each wheel, which material not only absorbs the concussions or shocks and vibration imparted to the wheel while traveling, but also subdues sound.

My invention will be fully understood by reference to the annexed drawings.

Figure 1:
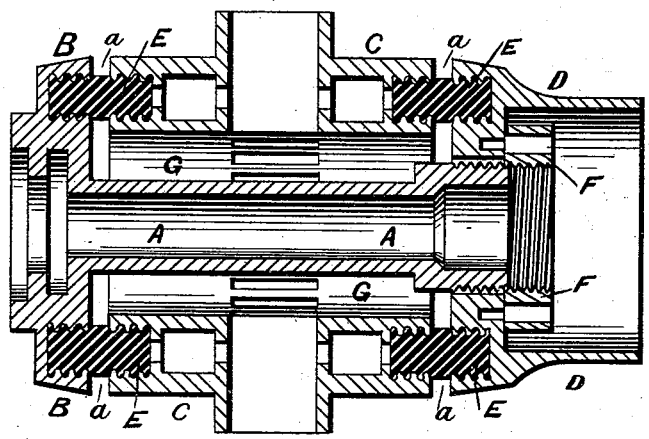
Figure 2:
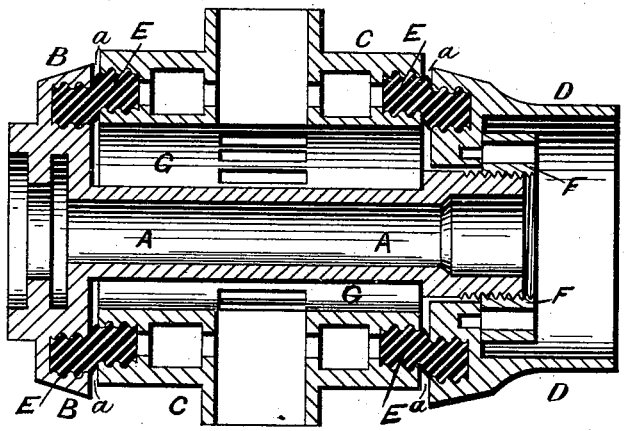
Figure 3:
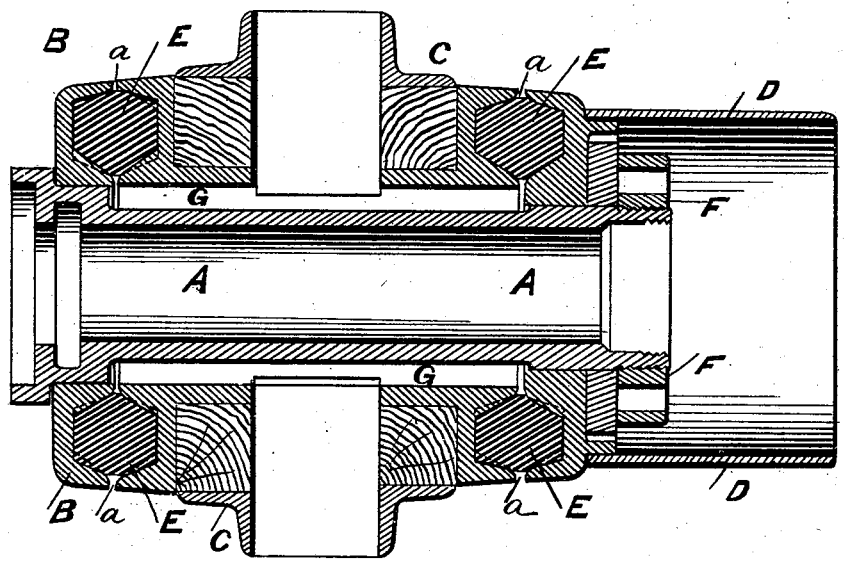
Figure 12:
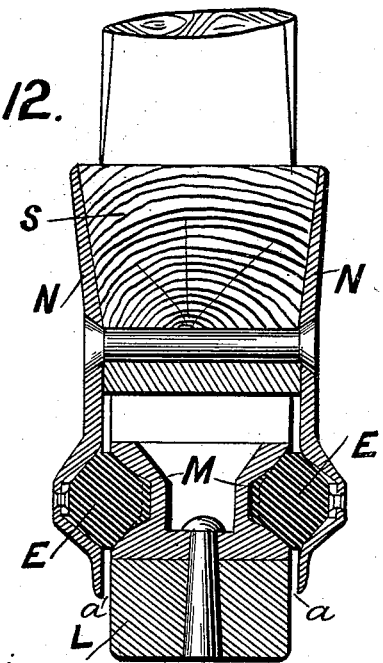
Figure 4:
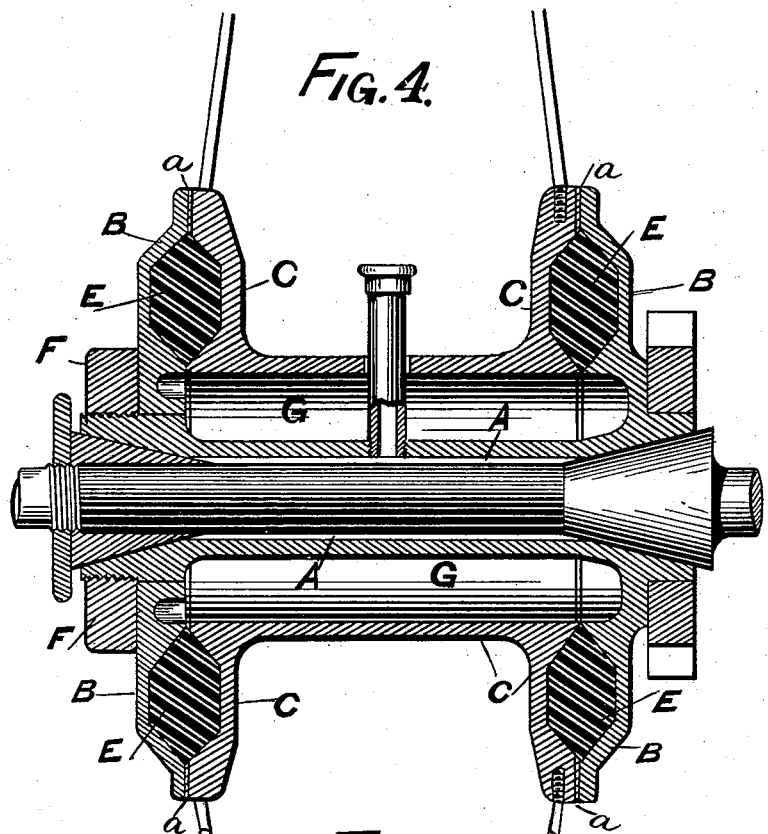
Figure 5:
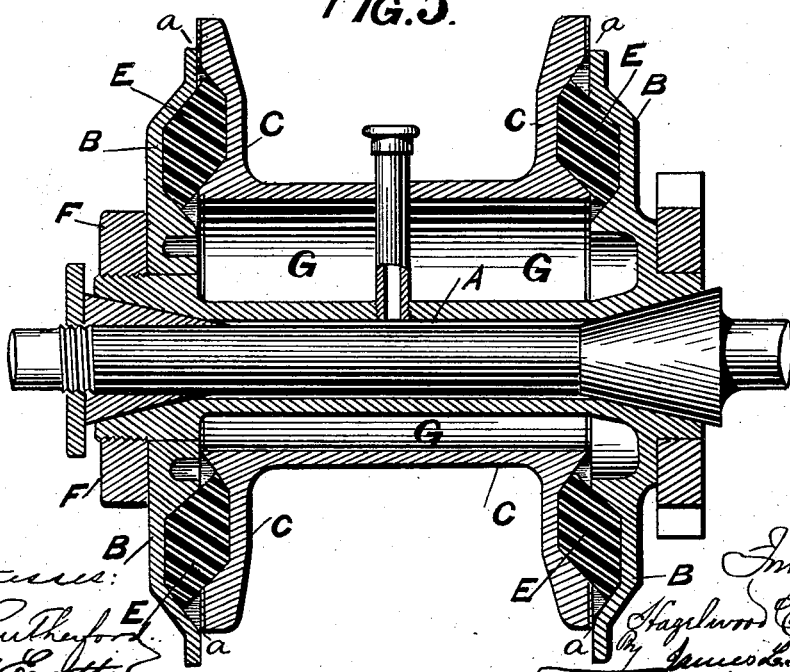
Figure 6:
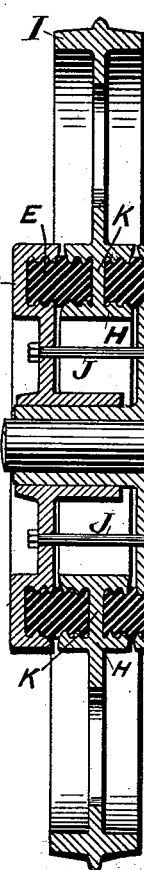
Figure 8:
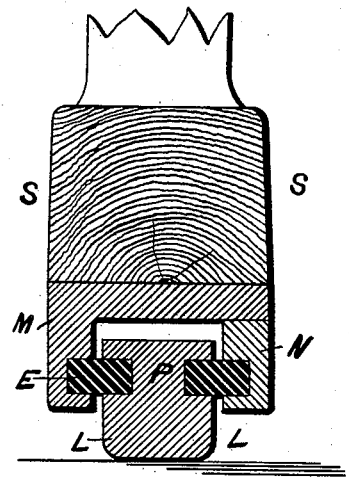
Figure 7:
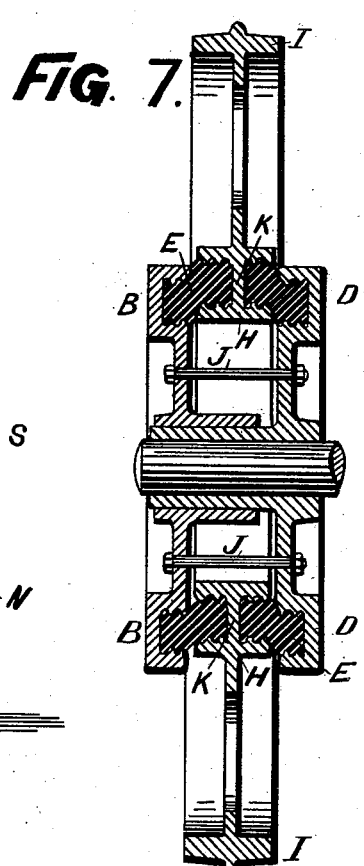
Figure 9:
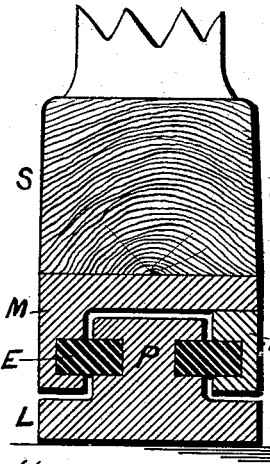
Figure 11:
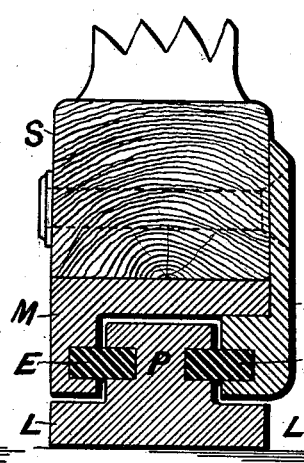
Figure 15:
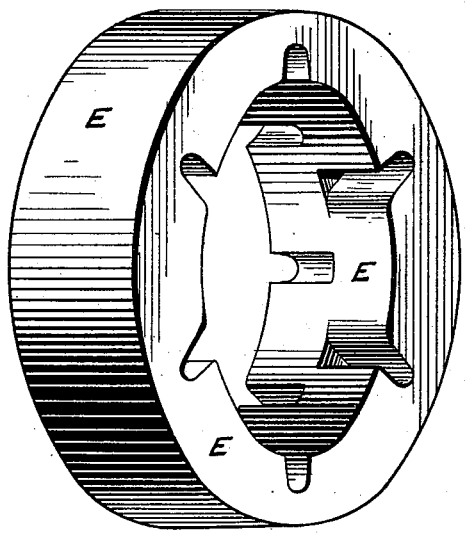
Figure 13:
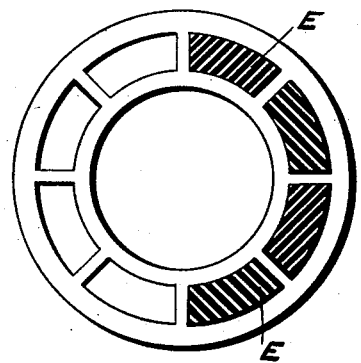
Figure 14:
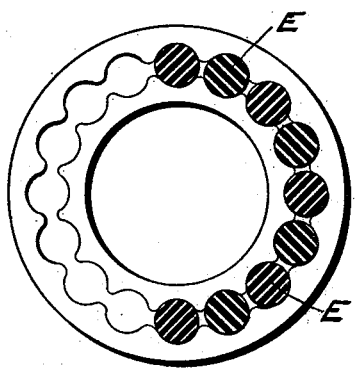
Figure 16:
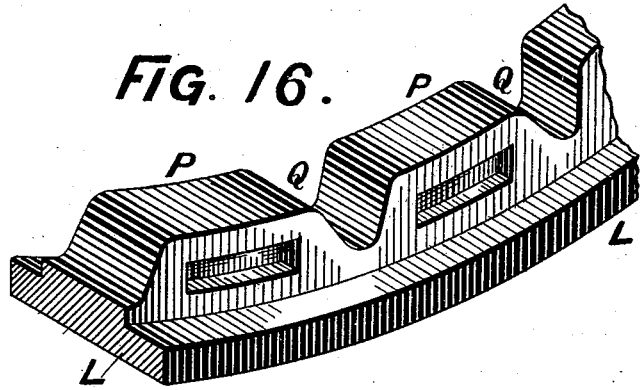
Figure 17:
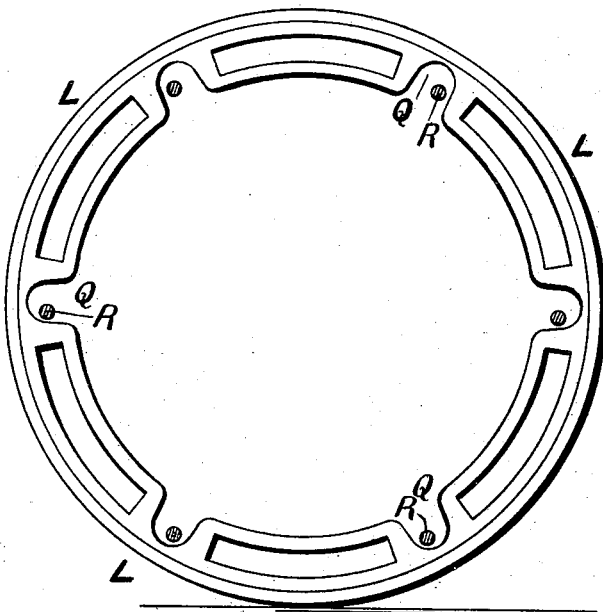

Figure 1 is a sectional elevation of the hub of an omnibus or carriage wheel with the india-rubber cushion in its normal condition; Fig. 2, similar sectional elevation with the india-rubber cushion distorted by supposed weight of load on axle-box, the cushion being of rectangular shape in cross-section; Fig. 3, sectional elevation of the hub of a cab or light cart wheel with india-rubber cushion of hexagonal shape in cross-section; Fig. 4, sectional elevation of a cycle-hub with india-rubber cushion of an awkwardly-shaped hexagonal form in cross-section, the rubber being in its normal condition; Fig. 5, similar views of cycle-hub with rubber cushion distorted by supposed weight of rider; Fig. 6, sectional elevation of car-wheel with rubber cushions in normal condition in the hub; Fig. 7, similar view of car-wheel with rubber cushion distorted by supposed weight of load on axle; Figs. 8 to 12, sectional elevations of tire portions of wheels with rubber cushions in position between tire and felly; Fig. 13, face view of hub with rectangular-shaped pockets for the reception of correspondingly-shaped rubber blocks; Fig. 14, face view of hub with circular-shaped pockets for the insertion of correspondingly-shaped rubber cushions; Fig. 15, perspective elevation of a ring of rubber as a wheel-cushion, with recesses at intervals in the inner face for reception of studs or excrescences on hub. Figs. 16 and 17 are perspective and elevation views of a wheel-tire with pockets for rubber cushions and with hollows in inner face for play round steadying-bolts of rim.

Figs. 1 and 2 are sectional views, respectively, of an axle-box A, with one or more recesses in back collar B, a wheel-hub C, with an annular recess in each end, and a front cap D, with one or more recesses in its inner face, these three parts being together and showing rubber blocks or rings E fitted within the recesses. The india-rubbers are retained in place by a nut F, screwed onto a threaded part of the outer end of the axle-box A, whereby the rubbers E E become slightly compressed and support the hub D in such a cushioned manner, and so that neither it or the back collar B ever come into contact with the axle-box A, there being at all times an annular space G between the outer surface of the axle-box A and the inner surface of the hub, which therefore permits of the rubbers E E being distorted between the edges of the flanges at *a* in Fig. 2, which figure represents a wheel with the load acting on the axle-box A in opposition to the upward pressure of the hub C by the wheel's contact with the ground, the distortion of the rubbers continually changing as the wheel rotates. Any kind of grip on the rubber can be obtained by the formation of the recesses, such as by undulating, as at Figs. 1 and 2, or by pockets, as at Figs. 13 and 14, or by projections to suit the rubber ring. (Shown at Fig. 15.)

Figs. 1 and 2 show a convenient method of putting my invention into practice, where the axle is a stationary one and the wheel rotates round it, as with wheels of ordinary road-vehicles; but my invention is equally well applied where the axle and the wheel are fixed together and rotate with each other, as in the case of tram-car wheels, as will be understood by reference to Fig. 6, which shows a tram-wheel in section. The hub of the wheel in this case is composed of two annular collars B D, each with a recess or recesses in its inner face and looking toward each other for the reception of the rubber rings or rubber blocks E E, which also occupy a position in grooves formed in the two faces of a web H, to which the rim or tire I is attached. The two annular collars B D are so made that they can be drawn toward one another by bolts J J and the rubbers E E be slightly compressed between them, and of a mid-flange K at the base of the recesses in the annular portions of the web, whereby the same action on the rubbers E E as that described for the wheel, Figs. 1 and 2, will take place, and as seen at Fig. 7.

Figure 10:
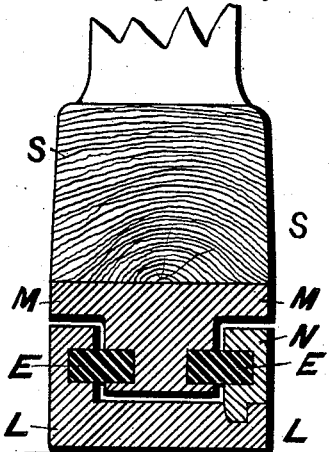

Figs. 8, 9, 10, 11, and 12 show sectional portions of wheel-rims with rubber blocks E E arranged in recesses in the tire L and in band M and plate N. The band M in Fig. 10 is produced from a reverse bend of the bar which constitutes the tire (shown at Fig. 9,) and a plate N may be bolted to the felly, as at Fig. 11, on the outside of the wheel as a protector when running against curbstones. The inner periphery of the tire L or the band M may be plain and have holes through the web P, or the web may be shaped as at Figs. 16 and 17, the intervening spaces Q Q serving for the passage of bolts R R to have free motion into the varying deflection and rolling motion of the wheel while traveling.

To make up the cushioned tire of such a wheel, I first form an L-shaped bar or band M with apertures in one inner face for the reception of the rubber blocks E E. I then bolt the band to the felly S, like an ordinary tire. I then insert the blocks E E in the apertures and place the tire L over them, so that they— *i. e.*, the blocks—engage the apertures in the tire. The second set of rubber blocks is then placed in apertures in the other side of the tire L and the plate N put on. The bolts R R are then inserted into their respective holes, and the screwing up determines the compression and the fixation of the rubber blocks E E. The rubber blocks whether for hub or rim may be of a shape other than those indicated—such, for instance, that shown in Figs. 14 and 15.

What I claim is—

1. The combination of a wheel comprising recessed parts, one of which parts is vertically movable with respect to the other, and rubber elements or parts, the ends of which are disposed in the recesses in the parts comprised in the wheel and a portion of the surface of which is exposed, substantially as and for the purpose described.

2. The combination of a wheel comprising recessed parts, one of which parts is movable with respect to the other in the line of pressure exerted by the load carried, and rubber elements or parts, the ends of which are disposed in the recesses in the parts comprised in the wheel and a portion of the surface of which is exposed, substantially as and for the purpose described.

3. The combination of the hub having recesses, the parts B D, provided with recesses, the said hub vertically movable with respect to said parts B D, and the rubber cushions E E, the ends of which are disposed in the recesses in the hub C and parts B and D, a portion of the rubber cushions, as *a*, being exposed, substantially as and for the purpose described.

In witness whereof I have hereto signed my name, in the presence of two subscribing witnesses, this 22d day of May, 1891.

HAZELWOOD CARMONT.

Witnesses:
HARVEY GARDNER,
CHARLES ALFRED GROSSETETE,
*Both of 166 Fleet Street, London, England.*